United States Patent [19]
Yoshida et al.

[11] Patent Number: 5,004,154
[45] Date of Patent: Apr. 2, 1991

[54] HIGH PRESSURE FUEL INJECTION DEVICE FOR ENGINE

[75] Inventors: Takeo Yoshida; Hajime Kishida, both of Iwata, Japan

[73] Assignee: Yamaha Hatsudoki Kabushiki Kaisha, Iwata, Japan

[21] Appl. No.: 422,031

[22] Filed: Oct. 16, 1989

[30] Foreign Application Priority Data

Oct. 17, 1988 [JP] Japan .................................. 63-259563
Feb. 20, 1989 [JP] Japan ..................................... 1-39650

[51] Int. Cl.$^5$ ............................................ F02M 47/02
[52] U.S. Cl. ....................................... 239/96; 239/124; 239/533.4; 239/533.8; 239/533.12; 239/585
[58] Field of Search ..................................... 239/88-92, 239/96, 124, 533.4, 533.5, 533 B, 533.12, 585

[56] References Cited

U.S. PATENT DOCUMENTS

| | | | |
|---|---|---|---|
| 2,584,745 | 2/1952 | Seliber | 239/533.4 |
| 4,030,668 | 6/1977 | Kiwior | 239/585 |
| 4,425,893 | 1/1984 | McJones et al. | 239/88 |
| 4,513,719 | 4/1985 | Edo | 239/96 |
| 4,566,416 | 1/1986 | Berchtold | 239/585 |
| 4,637,553 | 1/1987 | Kushida et al. | 239/533.4 |
| 4,899,935 | 2/1990 | Yoshida et al. | 239/91 |

*Primary Examiner*—Andres Kashnikow
*Assistant Examiner*—Michael J. Forman
*Attorney, Agent, or Firm*—Ernest A. Beutler

[57] ABSTRACT

An accumulator type injection nozzle wherein a variable stop that is electrically actuated is provided for controlling the maximum degree of opening of the injection valve for controlling the amount of fuel discharged.

14 Claims, 2 Drawing Sheets

HIGH PRESSURE FUEL INJECTION DEVICE FOR ENGINE

BACKGROUND OF THE INVENTION

This invention relates to an high pressure fuel injection device for an engine and more particularly to an improved fuel control system for such a fuel injection device.

It is well recognized that a proper fuel injection device can be highly effective in controlling the fuel consumption and lowering emission of exhaust gases of internal combustion engines, particularly diesel engines. A widely used type of fuel injection nozzle is the accumulator type nozzle in which the valve member of the nozzle is contained within an accumulator chamber for controlling the flow of fuel from the nozzle port that extends from this accumulator chamber. The injection valve either has affixed to it or is associated with an actuating member that is slidably supported in a control chamber which is also pressurized with fuel at the same pressure as in the accumulator chamber. As a result, the balanced pressures hold the valve member in its closed position. However, a relief valve is provided for relieving the pressure in the control chamber and when this occurs the unbalanced pressure on the valve member causes it to open and eject the fuel in the accumulator chamber. This type of injection nozzle is extremely effective.

However, the amount of fuel discharge by such accumulator nozzles has been previously controlled by controlling either or both the pressure in the accumulator chamber and the rate of opening of the valve. These types of controls although effective are not capable of controlling the amount of fuel injection injected over a wide range as is required when the engine is used in applications such as automotive applications.

It is, therefore, a principal object of this invention to provide an improved accumulator type fuel injection device.

Is a further object of this invention to provide an improved control arrangement for controlling the amount of fuel discharge by an accumulator type fuel injection device.

It is yet a further object to this invention to provide a simple and yet effective control for controlling the degree of opening of the injection valve of an accumulator type fuel injection nozzle.

SUMMARY OF THE INVENTION

This invention is adapted to be embodied in an accumulator type injection nozzle that is comprised of an accumulator chamber that is adapted to be supplied with high pressure fuel. A nozzle port leads from the accumulator chamber and an injector valve is moved between a closed position and an open position for controlling the discharge of fuel from the accumulator chamber through the nozzle port. A control chamber also receives pressurized fuel and an actuating member is supportive for movement within the control chamber and is associated with the injector valve for retaining the injector valve in its closed position when the control chamber is pressurized and for movement of the injector valve to its open position when the pressure is relieved in the control chamber. A relief valve is also employed that is moveable between a closed position for maintaining pressure in the control chamber and an open position for relieving the control chamber for effecting fuel discharge through the nozzle port. Actuating means are associated with the relief valve for urging the relief valve to one of its positions when the actuating means is energized. In accordance with the invention, variable stop means are associated with injector valve for varying the open position of the injector valve to either of at least two selected positions for controlling the amount of fuel discharge by the injector valve.

DETAILED DESCRIPTION OF THE PREFERRED EMBODIMENTS OF THE INVENTION

Figure 1:
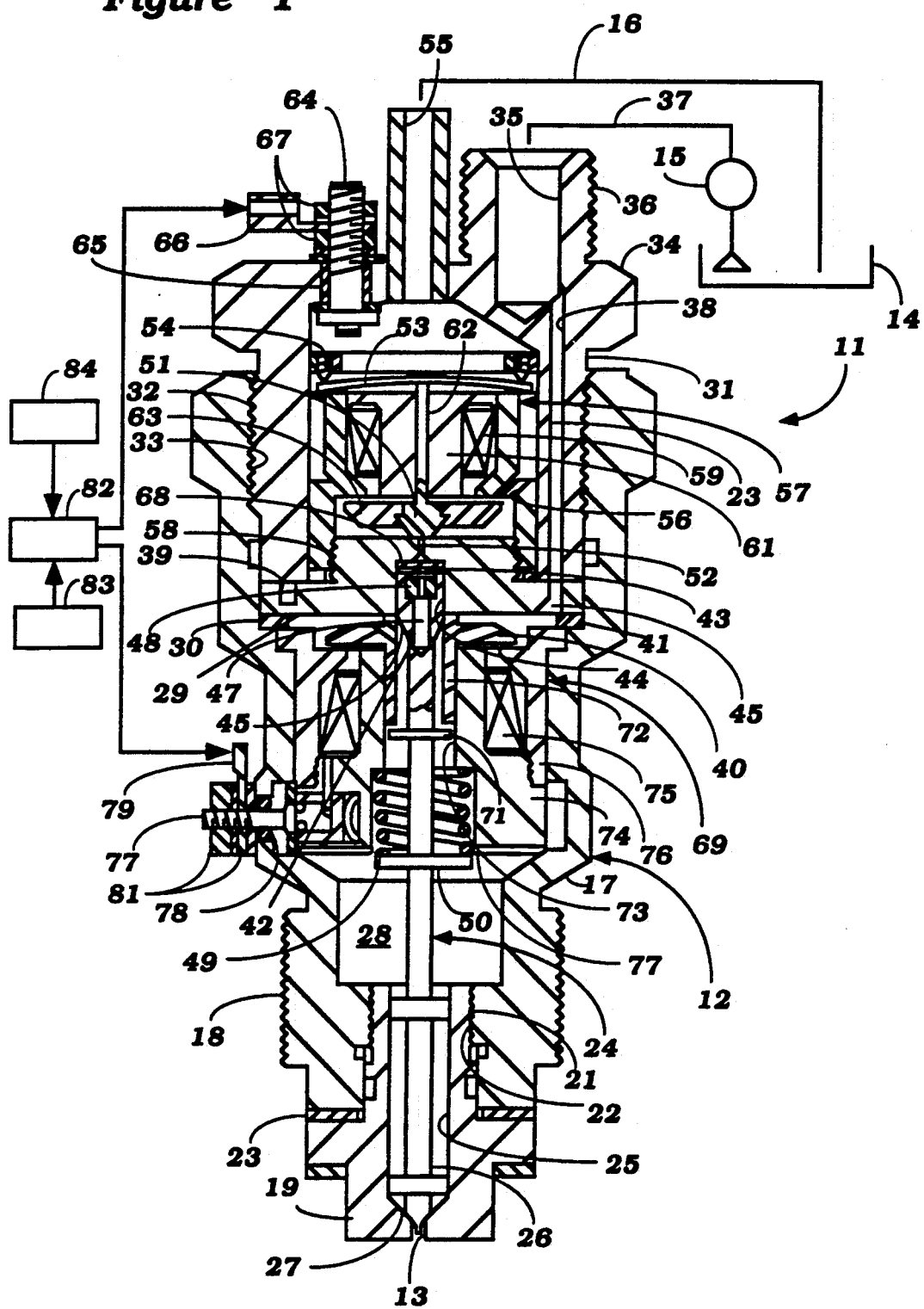
FIG. 1 is partially schematic cross sectional view showing an accumulator type of injection nozzle constructed in accordance with an embodiment of the invention.

Referring to the FIG. 1 of the drawings, a fuel injection nozzle constructed in accordance with an embodiment of the invention is identified generally by the reference numeral 11. The injection nozzle 11 is comprised of an outer housing assembly, indicated generally by the reference numeral 12 that is adapted to be mounted, in a manner to be described, in the cylinder head of an internal combustion engine with a nozzle port 13 communicating with the combustion chamber for delivering fuel to it in a manner to be described. Rather than direct cylinder injection, the invention may be utilized in conjunction with manifold injection systems but the invention has particular utility with direct injection, for example as used with high speed diesel engines.

Fuel is supplied to the injection nozzle 11 from a remotely positioned fuel tank 14 by means of a high pressure pump 15. Return fuel is returned back to the reservoir 14 through a return line 16. The fuel delivery and return systems per se form no part of the invention and, for that reason, they have been illustrated only schematically.

The outer housing 12 is comprised of a lower piece 17 that has a threaded lower end 18 that is adapted to be threaded into a suitable aperture in the cylinder head of the associated engine (not shown) in a known manner. The nozzle port 13 is defined by a tip 19 that has a threaded portion 21 that is received in a threaded bore 22 formed at the lower end of the housing piece 17. An adjusting shim 23 is interposed between the nozzle piece 19 and housing 17 for length adjustment.

An injection valve 24 is slidably supported within a bore 25 of the nozzle piece 19 and has a reduced diameter portion 26 and a flow controlling tip 27 configured as will be described and which, in the closed position, closes the injection nozzle port 13. The valve portion 26 has interrupted enlargements for slidably supporting the injection valve 24 in the bore 25 in a known manner.

An accumulator chamber 28 is formed above the bore 25 by the housing piece 17. The accumulator chamber 28 is closed at its upper end by means of a closure plate 29 that is held against a spacer 30 received in a recess in the housing piece 17 by a second housing piece 31. The housing piece 31 has a threaded portion 32 that is received within a threaded bore 33 of the housing piece 17 so as to hold the closure plate 29 in position and maintain the chamber 28 in a sealed condition, except as is hereinafter noted. Externally of the threaded opening 33, the housing piece 17 is formed with a hexagonal portion 34 so as to facilitate its insertion into the threaded bore of the cylinder head.

The housing piece 31 is formed with an inlet conduit 35 that has a threaded external portion 36 so as to receive a fitting for connecting a supply line 37 extending from the pressure pump 15 to the inlet conduit 35.

The inlet conduit 35, which is generally a drilled opening, is intersected by a further drilled passageway 38 that extends axially along the housing piece 31 at one side thereof and which communicates at its lower end with a corresponding circumferential groove 39 formed in the upper surface of the closure plate 29. The groove 39 is intersected by a bore 40. The bore 40 delivers fuel under pressure to the accumulator chamber 28 through a port 41 formed in a control stop armature 42. The function of the control stop armature 42 will be described later.

A control chamber 43 is formed in the closure plate 29 by means of a bore 44 that opens through the lower end of the closure plate 29. The injection valve 24 has a generally cylindrical actuator portion 45 that is slidably supported within the bore 44 and which closes the lower end of the control chamber 43. A passageway 46 formed in the actuation portion 45 intersects a bore 47 formed therein which pressurizes the control chamber 43, through a metering jet 48 and normally urge the injection valve 24 toward its downward or closed position.

A coil compression spring 49 encircles the injection valve 24 and bears against the housing assembly 12 in a manner to be described. The lower end of the spring 49 engages a shoulder formed by an enlargement 50 on the injection valve 24 so as to further assist in maintaining the injection valve 24 in the closed position as shown in FIG. 1.

A relief valve 51 is supported within the housing assembly 12 above the upper end of the closure plated 29 and controls the opening of a relief passage 52 formed in the upper end of the closure plate 29. The relief valve 51 is normally biased to a closed position by means of a leaf spring 53 the tension of which is adjusted by a screw 54.

The relief valve 51 when opened will permit the fuel in the control chamber 43 to return to the tank 14 through a return fitting 55 that extends axially through the end of the housing piece 31 parallel to the inlet passageway 35. The return passageway 54 communicates with the conduit 16.

Fuel can flow from the relief valve passageway 52 to the return passageway 55 through a port 56 formed in a yoke of an electromagnetic assembly, indicated generally by the reference numeral 57. This yoke of the electromagnetic assembly 57 has a threaded opening at its lower end which is received on a threaded portion 58 of the closure plate 29 so as to secure the electromagnetic assembly 57 in position.

The electromagnetic assembly 57 is comprised of a solenoid coil or winding 59 that is disposed in the yoke and which encircles a core 61. The core 61 is formed with a bore that slidably supports an extension 62 of the relief valve 51. This extension 62 bears against the leaf spring 53. The core 61 coacts with an armature 63 affixed to the relief valve 51 for opening it when the winding 59 is energized.

The circuit for energizing the winding 59 includes a terminal post 64 that extends through the upper end of the housing piece 31 with an insulating sleeve 65 being interposed between the housing piece 31 and the terminal post 64. An electrical tab connector 66 is held on the post 64 in electrical contact with it between a pair of nuts 67 so as to afford attachment to an appropriate lead of a circuit to be described.

As should be readily apparent, energization of the solenoid winding 59 will attract the armature 63 and relief valve 51 so as to open the relief valve port 52 and deplete the pressure in the control chamber 43. This depletion in pressure will cause the pressure acting on the injection valve 24 to urge the injection valve 24 upwardly toward an open position compressing the spring 49 and causing an amount of fuel to be delivered. The full opening position of the injection valve 24 is controlled by means of a control shim 68 that is position in the control chamber 43 and which will be engaged by the actuating portion 43 so as to limit the degree of maximum opening. As has been noted, with a system as thus far described the only way the amount of fuel injected can be varied is by varying the pressure in the accumulator chamber 28 and/or the rate and time of opening of injection valve 24.

In accordance with the invention, a control stop mechanism, indicated generally be the reference numeral 69 is provided in the accumulator chamber 28 below the plate 29 and cooperates with a stop shoulder 71 on the injection valve 24 to control its degree of movement. This control stop mechanism 69 includes the armature 42 previously described and which has a cylindrical extension 72 that is receive within a bore 73 of a core 74 of a solenoid. A solenoid winding 75 encircles the core 74 and is held in place by means of a yoke 76 that is received within the upper end of the accumulator 28. The core 73 is provided with a counter bore 77 that receives the spring 49 as previously described.

When the winding 75 is not energized, the armature 42 and its extension 72 may move to the upper position as shown in FIG. 1 and energization of the solenoid winding 59 will cause full reciprocal movement of the injection valve 24. However, when the winding 75 is energized, the armature 42 and extension 72 will be drawn downwardly so as to engage the shoulder 71 on the injection valve 24 and limit its upward movement. This operation will be discussed further in conjunction with FIGS. 2 through 10.

The winding for the coil 75 has a terminal post 77 that extends through the housing piece 17 with an insulating sleeve 78 interposed therebetween. A tab terminal 79 is held on the post 77 between a pair of nuts 81.

A control device indicated generally by the reference numeral 82 and which may be programmed to provide a suitable control, an example of which will be given by reference to a FIG. 5 through 10, provides the control strategy for actuating the winding 59 of the electromagnet 57 that controls the relief valve 51 and the winding 75 of the stop mechanism 69. In a typical example, the control mechanism 82 may receive input signals from a throttle position indication 83 and an engine speed indicator 84.

Figure 2:
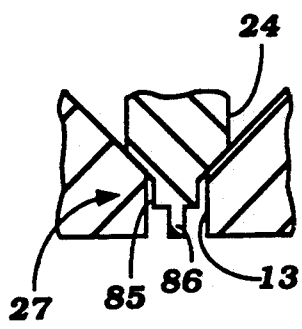
FIG. 2 is an enlarged cross sectional view showing the injector valve and nozzle port in the closed position.
Figure 3:
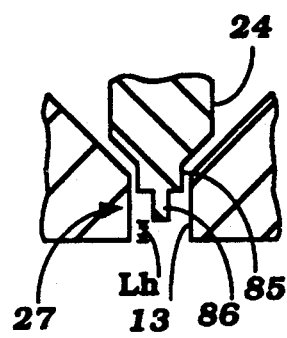
FIG. 3 is a cross sectional view, in part similar to FIG. 2, showing the injector valve in its opened, low fuel position.
Figure 4:
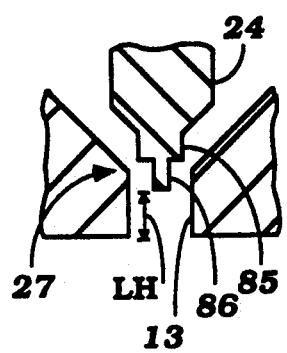
FIG. 4 is a cross sectional view showing the injector valve in its fully open, high flow position.
Figure 5:
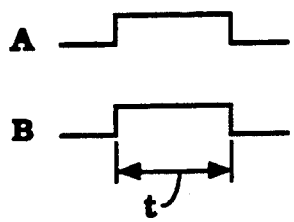
FIG. 5 is a graphical diagram showing one possible mode of actuating pulses for the injector valve and stop.
Figure 6:
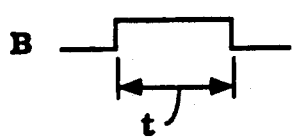
FIG. 6 is a graphical view, in part similar to FIG. 5, showing another control mode.

Referring to FIG. 2 through 4, as has been previously noted, the control tip portion 27 of the injection 24 is provided with a configured end so as to vary the amount of fuel supplied depending upon its position. For example, the end 27 is provided with a first, larger diameter cylindrical portion 85 and a second smaller diameter portion 86 that corporate with the nozzle port 13 so as to control the flow through it. FIG. 2 shows the closed position while FIG. 3 shows the position for low fuel flow. In this position the solenoid winding 75 will be energized so as to limit the degree of opening of the injection 24 to the height Lh. In this position, the nozzle port 83 is open but the larger diameter portion 85 of the injection valve tip 27 will still be in position in the nozzle port 13 so as to limit the fuel delivery.

On the other hand, when the winding 75 is not energized the injection valve 24 may move fully open to the position shown in FIG. 4 wherein the valve 24 moves through the distance LH. In this position, only the smaller diameter portion 86 will extend into the injection port 13 and substantially unrestricted fuel flow will be provided.

Figure 7:
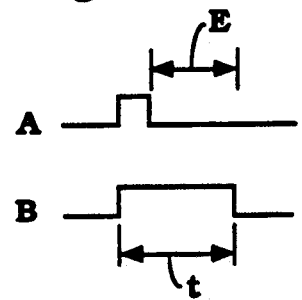
FIG. 7 is a graphical view, in part similar to FIG. 5 and 6, showing another control mode.
Figure 8:
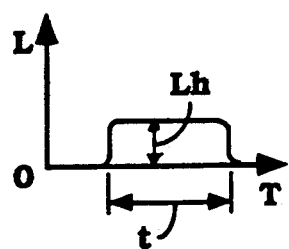
FIG. 8 is a graphical view showing the injector valve opening when operating in the mode shown in FIG. 5.
Figure 9:
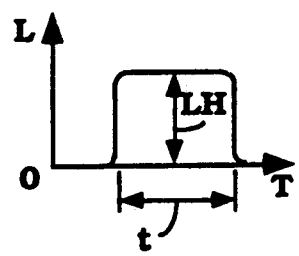
FIG. 9 is a graphical view showing the injector valve opening when operating in the mode of FIG. 6.

Referring now to FIG. 5 through 10, one form of control strategy is depicted. For low engine speeds and when low fuel discharge is required, both the solenoid winding 75 is energized (pulse A) and the solenoid winding 59 is energized (pulse B) for the full time period t of injection. In this condition, the injection 24 will move to the position shown in FIG. 3 and a fuel discharge as shown in FIG. 8 will be a accomplished.

On the other hand, at maximum engine speed, the winding 75 is not provided with an energizing pulse and only the winding 59 is provided with an energizing pulse (B) for the time period t. The injection valve 24 is then held in its fully open position LH for the time t so as to achieve maximum fuel discharge.

Figure 10:
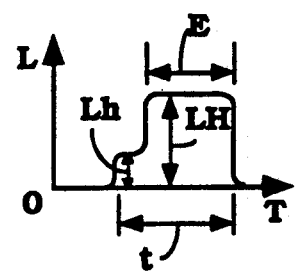
FIG. 10 is a graphical view showing the injector valve opening when operating in the mode of FIG. 4.

FIG. 7 and 10 show how intermediate speed and low ranges can be accommodated by providing full energization of the winding 59 for the time t and varying the energization of the winding 75 for varying time periods so as to provide an initially low opening of the injection 24 Lh and then a full opening LH for a variable time period E. By varying the relative times, the amount fuel delivered can be accurately controlled.

In the illustrated embodiment, the stop mechanism 55 cooperates directly with the portion of the injection valve 24 between the control chamber 43 and the nozzle port 13. It is to be understand, however, that various stop arrangements may be employed for controlling the movement of the injection valve 24. For example, the injection actuator portion 43 may be formed with an extension that extends through the relief port 51 which, in turn, has a variable stop mechanism associated with it for controlling the movement of the injection valve. Various other arrangements may be made without departing from the spirit and scope of the invention, as defined by the appended claims.

We claim:

1. An accumulator type of injection nozzle comprised of an accumulator chamber supplied with high pressure fuel from a fuel inlet, a nozzle port leading from said accumulator chamber, an injector valve means for moving said injector valve in response to fuel pressure relative to said nozzle port between a closed position and an open position for controlling the discharge of fuel from said accumulator chamber through said nozzle port, said means for moving said injector valve in response to fuel pressure comprising a control chamber for receiving pressurized fuel from said fuel inlet, said control chamber having a relief passage, an actuating member supported for movement within said control chamber and associated with said injector valve for retaining said injector valve in its closed position when said control chamber is pressurized and for movement of said injector valve to its opened position when pressure is relieved in said control chamber, and relief valve means moveable between a closed position for closing said relief passage and maintaining pressure in said control chamber and an opened position for opening said relief passage and relieving said control chamber pressure for effecting fuel discharge through said nozzle port and actuating means associated with said relief valve means for urging said relief valve means to one of its positions when said actuating means is energized, and variable stop means associated with said injector valve for varying the open position of said injector valve to either of at least two selected positions relative to said nozzle port for controlling the amount of fuel discharged by said injector valve.

2. An accumulator type of injection nozzle as set forth in claim 1 wherein the variable stop means comprises a moveable stop member associated with the injector valve and engageable therewith for limiting its movement in the open direction.

3. An accumulator type of injection nozzle as set forth in claim 2 wherein the actuating means comprises an electromagnet and wherein the means for controlling the variable stop element also comprises an electromagnet.

4. An accumulator type of injection nozzle as set forth in claim 3 wherein there are provided control means for selectively actuating the electromagnets for varying the amount of fuel delivered by varying the timing of actuation of each of said electromagnets.

5. An accumulator type of injection valve as set forth in claim 1 wherein the injector valve has a configured tip portion that cooperates with the nozzle port for varying the flow area through the nozzle port in response to the position of the injector valve.

6. An accumulator type of injection valve as set forth in claim 5 wherein the injector valve is moveable to a low flow position wherein the effective flow area between the nozzle port and said injector valve is reduced through cooperative actuation of said relief valve means and variable stop means.

7. An accumulator type of injection nozzle as set forth in claim 6 wherein the injector valve is moveable to a high flow position in its other open position wherein the flow through the nozzle port is substantially unrestricted through cooperative actuation of said relief valve means and variable stop means.

8. An accumulator type of injection nozzle as set forth in claim 7 wherein the injector valve configured tip portion is formed with a stepped part having a larger diameter portion and a smaller diameter portion.

9. An accumulator type of injection nozzle as set forth in claim 5 wherein the variable stop means comprises a moveable stop member associated with the injector valve and engageable therewith for controlling its movement.

10. An accumulator type of injection nozzle as set forth in claim 9 wherein there are provided control means for selectively actuating the electromagnet and wherein the means for controlling the variable stop element also comprises an electromagnet.

11. An accumulator type of injection nozzle as set forth in claim 10 wherein there are provided control means for selectively actuating the electromagnets for the varying the amount of fuel delivered by varying the timing of actuating of each of said electromagnets.

12. An accumulator type of injection nozzle as set forth in claim 5 wherein the injector valve has a configured tip portion that cooperates with the nozzle port for varying the flow area through the nozzle port in response to the position of the injector valve.

13. An accumulator type of injection nozzle as set forth in claim 12 wherein the injector valve is moveable to a high flow position in its other open position wherein the flow through the nozzle port is substantially unrestricted.

14. An accumulator type of injection nozzle as set forth in claim 13 wherein the injector valve configured tip portion is formed with a stepped part having a larger diameter portion and a smaller diameter portion.

* * * * *